United States Patent [19]
Ando et al.

[11] Patent Number: 6,166,514
[45] Date of Patent: Dec. 26, 2000

[54] APPARATUS AND METHOD FOR CONTROLLING INDUCTION MOTOR

[75] Inventors: Takeshi Ando; Tokunosuke Tanamachi; Eiichi Toyota, all of Hitachinaka; Kiyoshi Nakata, Iwase-machi; Masato Suzuki, Urizura-machi; Kouji Yasuda, Hitachinaka, all of Japan

[73] Assignee: Hitachi, Ltd., Tokyo, Japan

[21] Appl. No.: 09/381,402

[22] PCT Filed: Mar. 19, 1997

[86] PCT No.: PCT/JP97/00917

§ 371 Date: Sep. 20, 1999

§ 102(e) Date: Sep. 20, 1999

[87] PCT Pub. No.: WO98/42070

PCT Pub. Date: Sep. 24, 1998

[51] Int. Cl.$^7$ .................................. H02P 1/26
[52] U.S. Cl. ..................... 318/811; 318/727; 318/801; 318/810
[58] Field of Search ................... 318/727, 801, 318/810, 811

[56] References Cited

U.S. PATENT DOCUMENTS

| | | | |
|---|---|---|---|
| 4,459,534 | 7/1984 | Nagase et al. | 318/811 |
| 5,969,498 | 10/1999 | Cooke | 318/811 |
| 6,014,006 | 7/2000 | Stuntz et al. | 318/811 |

*Primary Examiner*—Khanh Dang
*Attorney, Agent, or Firm*—Antonelli, Terry, Stout & Kraus, LLP

[57] ABSTRACT

In a control apparatus of an induction motor including an inverter for converting a direct current to an alternating current having a variable voltage and variable frequency in accordance with a pulse width modulation control, and a controller for controlling an output voltage of said inverter through a modulation rate which is requested in accordance with an exciting magnetic current component command in a primary current of the induction motor driven by said inverter and a voltage component command corresponding to said respective components which are executed in accordance with a torque current component command, the control apparatus of the induction motor operates to detect a torque current component in accordance with said primary current of the induction motor, to correct said torque current component from a deviation between said detected torque current component value and said command value, to correct an output frequency of said inverter in accordance with said corrected torque current component command, and to limit the size of the modulation rate to less than a predetermined value or less than a predetermined condition. With this construction, in the induction motor, without the change-over from the low speed area to the high speed area (PWM pulse mode is 1 pulse area) where the size of the voltage command exceeds the maximum voltage capable of being output by the inverter, which is determined according to the direct current voltage, a good vector control can be carried out.

6 Claims, 3 Drawing Sheets

APPARATUS AND METHOD FOR CONTROLLING INDUCTION MOTOR

TECHNICAL FIELD

The present invention relates to the vector control of an induction motor; and, more particularly, the invention relates to a control apparatus for an induction motor and a method of control thereof where, even in a heretofore impossible voltage control operating area having a high operating frequency, satisfactory vector control can be carried out.

BACKGROUND OF THE INVENTION

A technique for carrying out vector control of an induction motor for driving a railway electric vehicle is described in Japanese application patent laid-open publication No. Hei 5-83976. In a railway electric vehicle, generally in a high speed operating area, in order to decrease the switching loss of an inverter or to utilize the direct current power supply voltage at a maximum efficiency, a control in which a PWM pulse mode becomes a one pulse mode is used.

In the one pulse mode, the size of the voltage can not be controlled, and so a technique has been proposed for carrying out a one pulse mode vector control, as described in a thirty-three times railway cybernetics use domestic symposium paper (1996, November) pp. 247–250 "A vehicle drive system where a vector control is adopted".

In the vector control technique described in Japanese application patent laid-open publication No. Hei 5-83976, the control apparatus includes two current control means for correcting two voltage command signals for the vector control in accordance with a deviation between an exciting current command value and a detected exciting current and in accordance with a deviation between a torque current command value and a detected torque current. In addition to the these two current control means, the apparatus also provides a third current control means for converting a slip frequency. However, since the control system construction becomes complicated, when a command signal is executed using a microcomputer, a problem occurs in that the execution time becomes long.

Further, in the above stated document "A vehicle drive system where a vector control is adopted", when using the one pulse mode, it is necessary to additionally employ a magnetic flux correction value function, namely a feedback for carrying a weak magnetic field. Further, in both conventional techniques, it is necessary to change over the control system between the pulse mode and modes other than the one pulse mode.

In addition to the above-stated two conventional techniques, there is a further technique described in Japanese application patent laid-open publication No. Hei 2-32788. In the vector control system described in this patent laid-open publication, as shown in FIG. 16 thereof, in response to each of the components of an exciting current and a torque current, a voltage command is executed. A command of the torque current provides a current control system for issuing a primary frequency command to suit an actual value and the above-stated voltage command is executed in accordance with the obtained primary frequency command. However, in the vector control described in this publication, since in the high speed operating area the PWM pulse mode becomes a one pulse mode, there is a problem in that, when the voltage control becomes ineffective, the vector control cannot be carried out, and there is no statement which gives consideration to this problem in the publication.

An object of the present invention is to provide a control apparatus for an induction motor and a method of control thereof in which, when vector control is carried out in the induction motor, a more simple control can be obtained; and, further, from a low speed operating area to a high speed operating area where the number of pulses of PWM becomes one pulse, in which the direct current power supply voltage of the PWM inverter is utilized at a maximum, a good vector control can be carried out continuously without a change-over between control means.

SUMMARY OF THE INVENTION

According to the present invention, in a control apparatus for an induction motor comprising an inverter for converting direct current to alternating current having a variable voltage and variable frequency in accordance with a pulse width modulation control, and a control apparatus for controlling an output voltage of said inverter in response to a modulation rate (an output voltage command) which is requested in accordance with an exciting magnetic current component command in a primary current of an induction motor driven by said inverter and a voltage component command corresponding to said respective components which is executed in accordance with a torque current component command, the control apparatus for the induction motor is characterized in that it comprises means for detecting a torque current component in accordance with said primary current of the induction motor, means for correcting said torque current component to eliminate a deviation between said detected torque current component value and a command value, means for correcting the output frequency of said inverter in accordance with said corrected torque current component command, and means for limiting the size of the modulation rate to under a predetermined value or a predetermined condition.

BEST MODE FOR CARRYING OUT THE INVENTION

Figure 1:
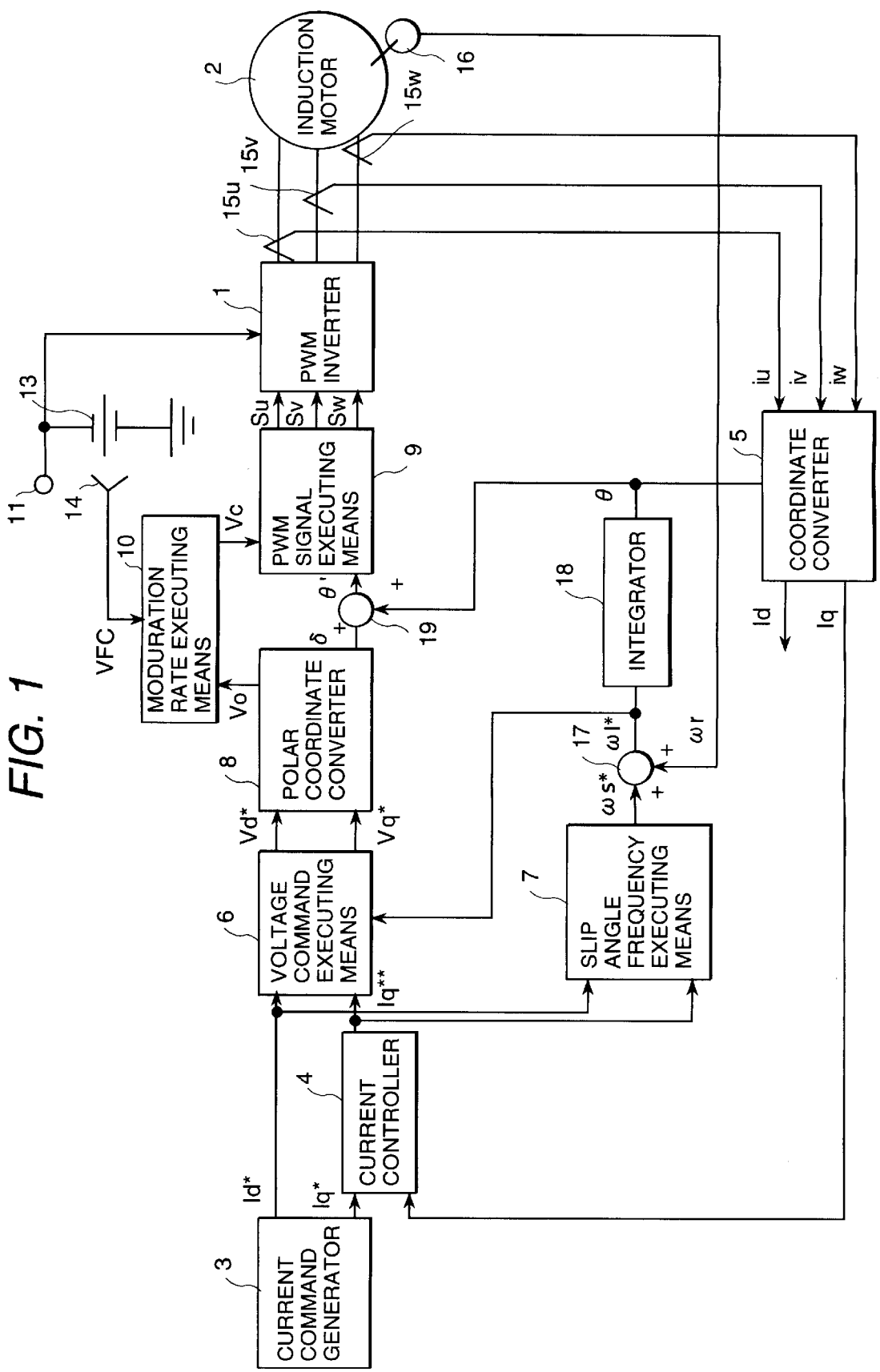
FIG. 1 is a block diagram showing a control apparatus representing one embodiment according to the present invention.

Hereinafter, one embodiment of the present invention will be explained with reference to FIG. 1. In this figure, a direct current which is supplied from a direct current power supply 11 is smoothed through a filter capacitor 13 and is supplied to a pulse mode modulation (hereinafter called a "PWM") inverter 1, operating as an electric power converter.

The PWM inverter 1 converts the direct current voltage, which is received from the power supply, to a three-phase alternating current, and a corresponding alternating voltage is supplied by the PWM inverter 1 to an induction motor 2. An electric vehicle can be operated using this induction motor 2 as a drive source.

A current command generator 3 generates an exciting current command value Id* and a torque current command value Iq*. A current controller 4 generates a torque current command value Iq** which is corrected in accordance with a deviation between the received torque current command value Iq* and a torque current detection value Iq, which is produced as an output of a coordinate converter 5, and this command value Iq is supplied to both a voltage command executing means 6 and a slip angle frequency executing means 7. The slip angle frequency executing means 7** operates to output a slip angle frequency command value ωs* in accordance with the exciting current command value Id* and the torque current command value Iq**.

The voltage command executing means 6 produces two voltage components Vd* and Vq* of a rotation magnetic field system supplied to the induction motor 2 in response to the corrected torque current command value Iq** and a primary angle frequency command ωI* (to be described later), and the two voltage components are applied to a polar coordinate converter 8, the polar coordinated converter 8 converts the voltage vectors which are expressed by Vd* and Vq*, to a voltage V0 representing the size and a voltage δ representing the phase of the voltage vector.

On the other hand, an induction motor velocity signal ωr, which is detected by a velocity detector 16, is added to a slip angle frequency command value ωs* received as an output of the slip angle frequency executing means 7, by an adder 17, and the primary angle frequency command ωI* is generated. This primary angle frequency command value ωI* is supplied both to an integrator 18 and to the voltage command executing means 6. The integrator 18 integrates the primary angle frequency command ωI* and produces a coordinate standard signal θ.

The coordinate converter 5 receives inverter output currents iu, iv and iw, which are detected through a current detector 15u, 15v and 15w for detecting the output current of the PWM inverter 1, and, in accordance with the coordinate standard signal θ, these signals are converted to the rotation magnetic field coordinate system exciting current component Id and the torque current component Iq, which component Iq is outputted to the current controller 4.

The adder 19 adds the coordinate standard signal θ, which is output from the adder 18, with the signal δ representing the phase of the voltage vector, which is output from the polar coordinate converter 8, and produces an output θ'.

A modulation rate executing means 10 produces a modulation rate signal Vc, in response to an output of a voltage detector 14 for detecting a direct current voltage VFC, which corresponds to the power supply voltage of the electric power converter by limiting the voltage V0 representing the size of the voltage vector which is output from the polar coordinate converter 8 so as to not exceed the maximum voltage capable of being output by the electric power converter.

The PWM signal executing means 9 generates ON, OFF pulses Su, Sv and Sw in accordance with the output Vc of the modulation rate executing means 10 and the output θ' of the adder 19, and these pulse signals are supplied to PWM inverter 1.

Next, the details of the above-described parts will be explained. The coordinate converter 5 produces, for example, the exciting current component Id and the torque current component Iq from the coordinate standard signal θ and the inverter output currents iu, iv and iw in accordance with the following formula (1).

$$\begin{bmatrix} Id \\ Id \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix} \begin{bmatrix} iu \\ iv \\ iu \end{bmatrix} \quad (1)$$

In the current controller 4, for example a proportional and integral control can be used. The following formula (2) is one example of such control. With this formula, in accordance with the deviation between the torque current command value Iq* and the torque current detection value Iq, the torque current command value Iq** is outputted.

$$Iq^{**} = Iq^* + \left(K1 + \frac{K2}{s}\right)(Iq^* - Iq) \quad (2)$$

Herein, K1 and K2 are a proportional coefficient and an integral coefficient, respectively, and s is the Laplace operator.

The following formula (3) is one example of the function performed by the voltage command executing means 6.

$$\begin{bmatrix} Vd^* \\ Vq^* \end{bmatrix} = \begin{bmatrix} r1 & -Ls\sigma\omega1 \\ L1\omega I^* & r1 \end{bmatrix} \begin{bmatrix} Id^* \\ Iq^{**} \end{bmatrix} \quad (3)$$

wherein, r1 is the primary resistance of the induction motor 2, Lσ is a leakage inductance, and L1 is a primary inductance.

The following formula (4) is one example of the function performed by the slip angle frequency executing means 7. Wherein, r2 is the secondary resistance of the induction motor 2 and M is a mutual inductance.

$$\omega s^* \frac{r2 \cdot Iq^{**}}{M \cdot Id^*} \quad (4)$$

The functions performed by the polar coordinate converter 8 are expressed by the following formula (5) and a following formula (6).

$$V0 = \sqrt{Vd^{*2} + Vq^{*2}} \quad (5)$$

$$\delta = \frac{I}{2} - \tan^{-1}\left(\frac{Vd^*}{Vq^*}\right) \quad (6)$$

Figure 2:
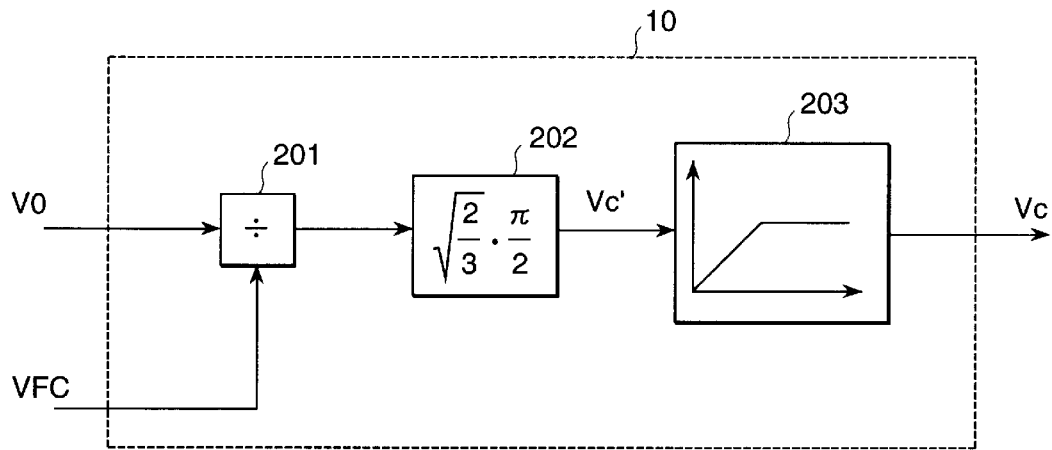
FIG. 2 is a diagram showing details of the modulation rate executing means in FIG. 1.

FIG. 2 shows one example of the modulation rate executing means 10. Using a divider 201, the output V0 of the polar coordinate converter 8 is divided by the filter capacitor voltage VCF, and the result is normalized to obtain the modulation rate Vc' via a multiplier 202, which value is inputted to a limiter 203. The limiter 203 operates to ensure that the modulation rate (the voltage command) which is outputted in response to the inputted modulation rate Vc' (the voltage command) does not exceed a predetermined value. The construction shown in FIG. 2 may be expressed by the following formula (7).

$$Vc = \min\left(\sqrt{\frac{2}{3}} \cdot \frac{\pi}{2} \cdot \frac{V0}{VFC}, 1\right) \quad (7)$$

Herein, the modulation rate Vc is scale-converted to produce a voltage Vc which has a maximum value of 1. The expression min ( ) represents a function in which the minimum value is taken, so that when the calculated result exceeds 1, Vc is limited to 1. According to the formula (7), the maximum value V0max of V0 is represented by the following formula (8).

$$V0max = \sqrt{\frac{3}{2}} \cdot \frac{2}{\pi} \cdot VFC \qquad (8)$$

With the system configuration of FIG. 1 and the control functions indicated by the formula (1) to the formula (7), as explained above, from the low speed operating area to the high speed operating area in which the pulse mode of the PWM for utilizing the direct current of the PWM inverter 1 at the maximum becomes one pulse, a good control can be carried out.

Hereinafter, an example of the operation of the above-described control apparatus will be explained.

First of all, an example of the operation in the low speed operating area where the voltage command value is smaller than the maximum voltage for enabling an output in the electric power converter, which is determined by the direct current voltage of the power supply, will be explained. Since the output V0 of the polar coordinate converter 8 is smaller that the voltage V0max which is limited by the modulation rate executing means 10, Vc<1. At this time, under an ideal condition in which there is no error in the voltage which is outputted from the PWM inverter 1 and the parameters of the induction motor 2 are consistent with the parameters used in the voltage command calculating means 6 and the slip angle frequency calculating means 7, the PWM inverter 1 will output a voltage according to the applied voltage command value. As a result, the outputs Id* and Iq* of the current command generator 3 are entirely consistent with the outputs Id and Iq of the coordinate converter 5, so that proper vector control is carried out.

In actuality, one can expect some error in the output voltage of the PWM converter 1 and fluctuation of the parameters of the induction motor 2, so that there will be an inconsistency between the outputs Id* and Iq* and the outputs Id and Iq; however, in this case, the output Iq is controlled to be consistent with the output Iq*. For example, when the secondary resistance r2 of the induction motor 2 is larger than the related r2, which is used in the operation in the slip angle frequency calculating means 7, since the slip angle frequency command value ωs* which is outputted from the slip angle frequency calculating means 7 is smaller than the value which should be outputted, the current of the induction motor 2 becomes small. This causes an inconsistency to occur between the output Iq and the output Iq*. At this time, the current controller 4 works to get rid of this inconsistency by increasing the output Iq**. Accordingly, since the slip angle frequency command value ωs* is made larger and the error resulting from the fluctuations of the parameters is corrected, even when there is some mount error according to the parameters, due to the operation of the current controller 4, the vector control can be carried out in a stable manner.

Next, an example of the operation in the high speed operation area, where the voltage which is outputted to the induction motor becomes more than the maximum voltage which is capable of being output by the electric power converter (the pulse mode of the PWM becomes one pulse), will be explained. Even under ideal conditions, where no parameter error of the induction motor exists, the magnitude of V0 representing the size of the voltage vector command value which is outputted from the polar coordinate converter 8 becomes larger than the voltage V0max, which is the maximum voltage outputted from PWM inverter 1, so that an inconsistency is created between the voltage command values and the output voltages. As a result, the outputs Id* and Iq* of the current command generator 3 are inconsistent with the voltages Id and Iq of the coordinate converter 5.

The means for solving the problems created under the above-stated conditions is the modulation rate executing means 10. The modulation rate executing means 10, as shown in FIG. 2, operates such that, when the executed voltage command Vc' is larger than the voltage V0max which is the maximum output to be outputted, the magnitude of V0 is limited, and the limited value is outputted as the modulation rate (the output voltage command) Vc of the inverter.

In accordance with the conventional vector control, it is necessary to feedback an amount which corresponds to a difference between Vc' and V0max. For example, in the above stated document "A vehicle drive system where a vector control is adopted", it is proposed to reduce the exciting current command value Id* which is output by the current command generator 3. (Further, in the explanation of the operation of the present invention, the exciting current command value is expressed as Id** when the vector control is carried out by adjusting the value Id* as stated above).

However, according to the present invention, there is the essential feature that, without any provision of the above-stated feedback, the vector control can be carried out. Based on this fact, hereinafter, the control principle of he present invention will be explained in detail.

In the current controller 4 shown in FIG. 1, during operation in the low speed area as described above, the main function is to provide compensation in response to parameter fluctuation, while in the high speed operating area, this current controller operates to be consistent with the error between the output Iq* and the output Iq according to the inconsistency of the voltage as described above.

For example, when the voltage Vc' is larger than the voltage V0max, in response to the difference between them, the output Iq** of the current controller 4 is increased relative to the output Iq*. As a result, in the balanced condition of the control, Iq**/Id* which is a ratio between the output Iq** of the current controller 4 and the output Id* of the current command generator 3 equals Iq*/Id** which is a ratio where the vector control is carried out originally. At this time, the slip angle frequency command value ωs*, which is output by the slip angle frequency calculating means 7, as clearly shown in the formula (4), becomes equal to the case where the vector control is carried out; and, in accordance with the slip angle frequency command value ωs*, it becomes equal to the coordinate standard signal θ which is produced by the adder 17 and an integrator 18.

Similarly to the above, until the time when the control reaches the balanced condition, which is regarded as a point where there is no change in the velocity ωr of the induction motor 2, the response time of the current controller 4 is determined; accordingly, Vq*/Vd* which is a ratio between the output Vd* and the voltage Vq* of the current command calculating means 6 is not changed, in accordance with the formula (3).

Accordingly, from the formula (6), it is seen that the output δ of the polar coordinate converter 8 becomes to be equal to the vector control in which the original vector control is carried out. As a result, since the signal θ' which is produced in the adder 19 becomes equal, there is supplied to the induction motor 2 a voltage which is the same as that supplied under ordinary vector control, and then, ideally, the coordinate converter 5 will produce the output fd** and the output Iq* which are values that are the same as those which will occur when ordinary vector control is carried out. Since the current controller 4 includes an integration component, even when the voltage Iq* becomes equal to the voltage Iq, the output Iq reaches a balanced condition when the output Iq** is larger than the output Iq*.

In other words, even when the output V0 of the polar coordinate converter 8 is larger than the value V0max, which is the maximum voltage value outputted from the PWM inverter 1, according to the present invention, as a result of the function performed by the current controller 4, even when the current command generator 3 is not adjusted, the operation becomes entirely equivalent to the case where vector control is carried out in which the exciting current command value is lowered automatically. With another mode of the expression, when the output voltage of the PWM converter is fixed to the maximum voltage to be outputted, automatically a weak magnetic field control is carried out, Further, in accordance with this control, when the direct voltage of the power supply fluctuates, as a result of the function performed by the above-stated control system, the affect is corrected automatically, and then, under ordinary conditions, the torque current Iq is controlled so as to always be consistent with the torque current command value Iq*.

Figure 3:
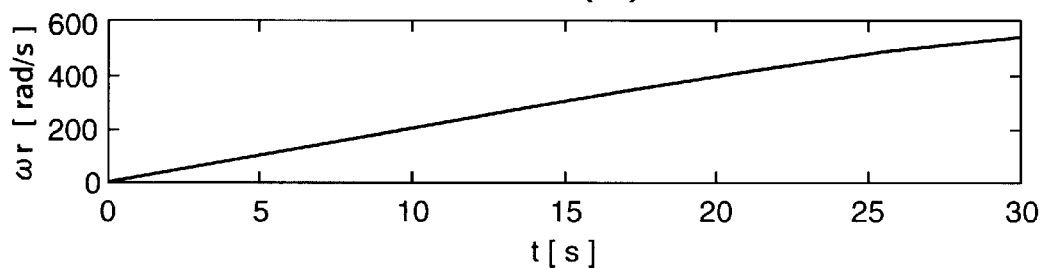
FIGS. 3(a) to 3(d) are diagrams which shown an example of the control according to the present invention.
Figure 3:
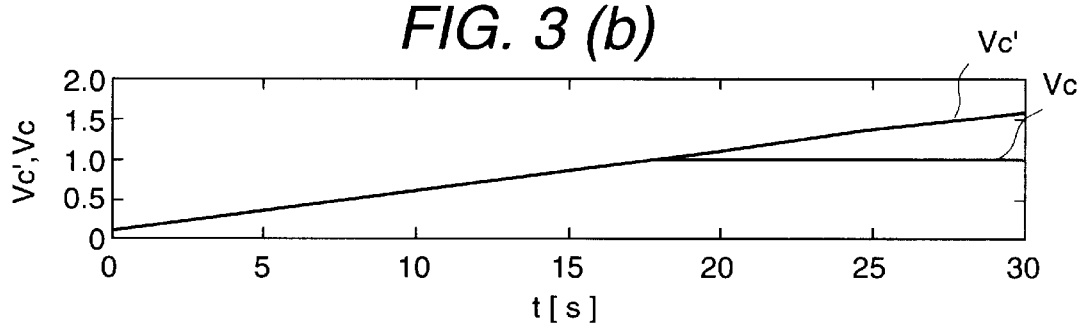
Figure 3:
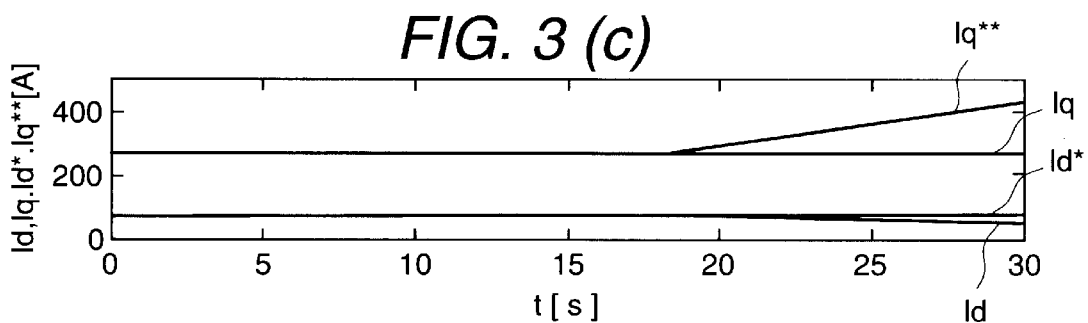
Figure 3:
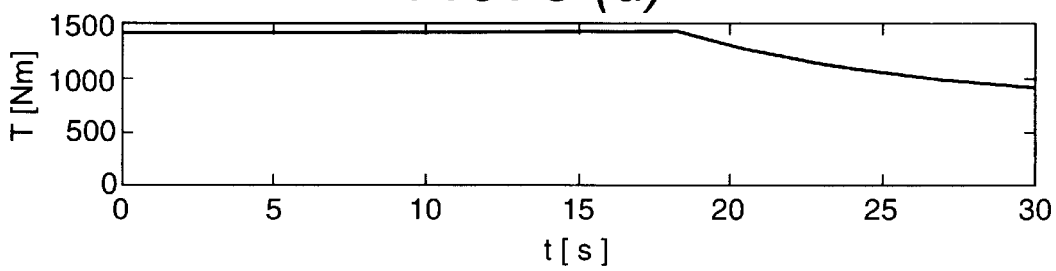

FIGS. 3(a) to 3(d) are diagrams in which the operation of the control system is simulated from the stationary condition of the induction motor to an operating area where the output voltage of the inverter reaches the maximum value and the voltage becomes constant. FIG. 3(a) shows the velocity ωt of the induction motor relative to the time t, and further indicates that the induction motor is accelerated with time. FIG. 3(b) shows the change with time of the output Vc' in which the output V0 of the polar coordinate converter 8 is scale-converted and is made to have the same scale as the modulation rate Vc at the output of the modulation rate executing means 10. In the vicinity of 18 seconds, the output Vc' is subjected to the operation of limiter 203, and after that the output Vc is fixed to "1" (the maximum possible output voltage of PWM inverter). FIG. 3(c) shows the time change of the output Id and the output Iq of the coordinate converter 5, the output Id* of the current command generator 3 and the output Iq** of the current controller 4. Herein, the output Id* and the output Iq* from the current controller 4 are constant. Until the voltage is limited, the voltage is consistent with the voltage Id* and further the output Iq is consistent with the output Iq; however, after the time where the voltage becomes constant, the output Iq becomes larger in comparison to the velocity of the induction motor after the time when the voltage becomes constant. On the other hand, the voltage Id, after the voltage becomes constant, becomes small gradually relative to the voltage Id*. Namely, a weak magnetic field control is carried out.

Further, although not shown in figure, the output Iq* commands a constant value to the output Iq due to the operation of the current controller 4, and the command value of the output id* is given as a constant value.

FIG. 3(d) shows the time change of the torque of the induction motor. In this regard, until the time point where the voltage limitation begins, since the torque current command value Iq* and the exciting current command value Id* are constant, the torque becomes constant. After the time point when the voltage limitation begins, when the command value is constant, since the voltage given to the induction motor is limited, the torque is lowered automatically in a period where the weak magnetic field control is carried out.

As stated above, the control operation according to the above-stated control principle has been confirmed during simulation, and it can be seen that the vector control can be realized continuously from the low speed operating area to the high speed operating area.

Figure 4:
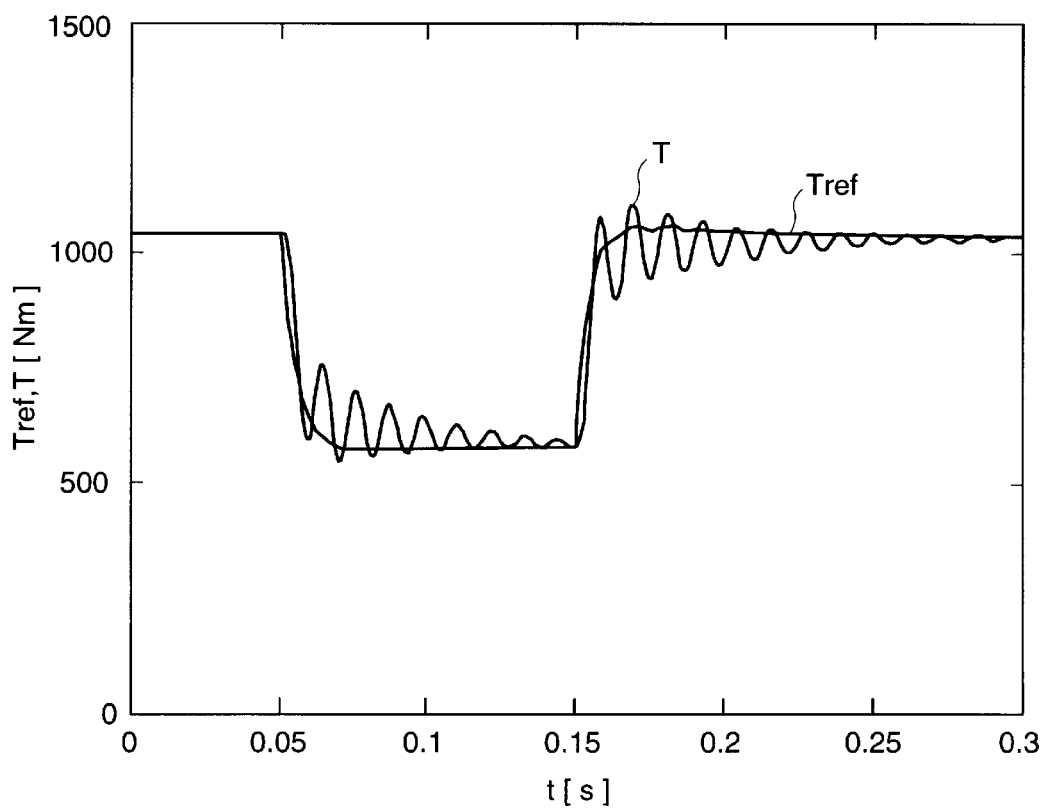
FIG. 4 is a torque response characteristic diagram according to the present invention.

Next, the vector control provided in this embodiment will be considered from another aspect. FIG. 4 shows one example of the torque response simulation in the voltage constant area (in the vicinity of 25 seconds in FIG. 3(b)). In FIG. 4, in the response characteristics of a torque T of the induction motor against a change of a torque command value Tref, some transient vibration is generated; however, in spite of this transient vibration, the torque T will response speedily to the command value Tref. As a result, it can be understood that, from the above fact, the vector control can be carried out according to this embodiment. Further, by establishing a control constant of the current controller 4 at an optimum value to suit a constant of the induction motor, which becomes the control subject, the transient vibration generated as described above can be reduced.

With the above it can be seen that, according to this embodiment, only one current controller and the modulation rate executing means are required for controlling the torque current from the low speed operating area to the high speed operating area, in which the size of the voltage command is greater than the maximum voltage capable of being output by the inverter, which is determined by the direct current (PWM pulse motor is operating in the one pulse area), without changing continuously the control construction. Thus, the induction motor can perform satisfactory vector control, particularly in an area of high speed operation where the voltage pulse is one pulse, and the torque response can be made rapidly.

Further, as shown in FIG. 2, with respect to the modulation rate Vc, since the correction accompanying the fluctuation of the direct current power supply voltage VFC is carried out automatically, without an affect of the direct current power supply voltage fluctuation, the output of the inverter, like the command value, can be controlled.

Further, in the above-described embodiment, a case has been considered where the limitation value of the voltage limiter is made to be the maximum voltage capable of output by the electric power converter; however, the limitation value of the voltage limiter can be set at an arbitrary voltage in which to start the weak magnetic field control and from a voluntary point at which the weak magnetic field control is carried out. As a result, merely by altering this set value, the weak magnetic field control can be carried out. Since it is unnecessary to prepare the special weak magnetic field pattern of the exciting field current command Id* as used in the prior art, a simple performance of the control construction can be achieved.

Further, according to this embodiment, the current control is provided only for the torque current; however, in the low speed area of operation, where the voltage command value is smaller than the maximum voltage capable of being output by the electric power converter, which is determined according to the direct current voltage of the power supply, current control can be provided for both of the exciting magnetic current and the torque current. However, when the output V0 of the polar coordinate calculating means 8 becomes larger than the maximum voltage V0max, to not operate the current controller for control of the exciting magnetic current, it is necessary to change over the control. Because, in this case, as understood from FIG. 3, it is not necessary to make the exciting magnetic current command value Id* which is provided at the output of the current command generator 3 coincide with the exciting magnetic current detection value Id which is provided at the output of the coordinate converter 5, when a current controller having an integration component for making an ordinary deviation to zero in accordance with the deviation between the value Id* and the value Id is provided, the control of the present invention is not consisted of.

According to the present invention, in the induction motor, without the change over from the low speed operation area to the high speed operation area (where the PWM pulse mode is one pulse) where the size of the voltage command (the modulation rate) exceeds the maximum voltage capable of being output by the inverter which is determined according to the direct current voltage, a good vector control can be carried out. As a result, the present invention can be utilized in the control use of an electric car of a railway in which the torque response characteristic is required and in an electric vehicle for running on the road.

What is claimed is:

1. In a control apparatus for an induction motor comprising an inverter for converting a direct current to an alternating current having a variable voltage and variable frequency in accordance with a pulse width modulation control, and a controller for controlling an output voltage of said inverter using a modulation rate in the form of an output voltage command which is requested in accordance with an exciting magnetic current component command in a primary current of the induction motor driven by said inverter and a voltage component command corresponding to said respective components which are executed in accordance with a torque current component command, the control apparatus for the induction motor further comprising:

means for detecting a torque current component in accordance with said primary current of the induction motor;

means for correcting said torque current component with respect to a deviation between said detected torque current component value and said command value;

means for correcting an output frequency of said inverter in accordance with said corrected torque current component command; and means for limiting the magnitude of said modulation rate to less than a predetermined value or less than a predetermined condition.

2. A control apparatus for an induction motor according to claim 1, characterized in that said modulation rate is normalized in accordance with said magnitude in which said direct current voltage is detected.

3. A control apparatus for an induction motor according to claim 1, characterized in that during a period where the magnitude of the modulation rate is limited to less than said predetermined value, said exciting magnetic current component command is outputted from a command generating means which generates a predetermined value.

4. A control apparatus for an induction motor according to claim 1, characterized in that said predetermined value for limiting said magnitude of said modulation rate is established at the maximum voltage capable of being output by said inverter which is determined according to said direct current voltage.

5. A control apparatus for an induction motor according to claim 1, characterized in that said predetermined condition for limiting the magnitude of the modulation rate is that a pulse number during a phase voltage half-periodic period of said output of said inverter is 1 pulse.

6. In a method of control of an induction motor which in controlling an inverter which converts converting a direct current to an alternating current having a variable voltage and variable frequency and a constant voltage and variable frequency in which an output voltage of said inverter is controlled, and through a modulation rate in the form of an output voltage command which is requested in accordance with an exciting magnetic current component command in a primary current of the induction motor driven by said inverter and a voltage component command corresponding to said respective components which are executed in accordance with a torque current component command, the control method of the induction motor comprising the steps of:

after a transfer from a control of said variable voltage and variable frequency to a control area of said constant voltage and variable frequency, limiting said modulation rate to a predetermined value, and increasing said torque current component command in response to an increase of an output frequency of said inverter.

* * * * *